United States Patent
Sun et al.

(10) Patent No.: US 11,662,709 B2
(45) Date of Patent: May 30, 2023

(54) DEVICE, METHOD AND NON-TRANSITORY STORAGE MEDIUM FOR CONTROLLING CUTTING TOOL

(71) Applicant: Fulian Yuzhan Precision Technology Co., Ltd, Shenzhen (CN)

(72) Inventors: Cheng-I Sun, New Taipei (TW); Chang-Sheng Chen, New Taipei (TW); Yong Yang, Shenzhen (CN)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 73 days.

(21) Appl. No.: 17/347,891

(22) Filed: Jun. 15, 2021

(65) Prior Publication Data

US 2021/0389750 A1 Dec. 16, 2021

(30) Foreign Application Priority Data

Jun. 16, 2020 (CN) .......................... 202010550682.9

(51) Int. Cl.
*G05B 19/4099* (2006.01)
*G05B 19/401* (2006.01)
(Continued)

(52) U.S. Cl.
CPC ....... *G05B 19/4099* (2013.01); *G05B 19/401* (2013.01); *G05B 19/404* (2013.01);
(Continued)

(58) Field of Classification Search
CPC .............. G05B 19/4099; G05B 19/401; G05B 19/404; G05B 19/4062; G05B 19/4083; G06F 17/10; G06F 17/13; G06N 7/00
See application file for complete search history.

(56) References Cited

U.S. PATENT DOCUMENTS

| 5,387,061 A | * | 2/1995 | Barkman | ............... | B23Q 17/24 |
| | | | | | 409/80 |
| 8,103,376 B2 | * | 1/2012 | Wang | .................... | B23Q 17/24 |
| | | | | | 382/152 |

(Continued)

FOREIGN PATENT DOCUMENTS

| CN | 85102868 | 9/1986 |
| CN | 109976265 | 7/2019 |

(Continued)

OTHER PUBLICATIONS

Mohammad R. Khoshdarregi et al., Integrated five-axis trajectory shaping and contour error compensation for high-speed CNC machine tools, Mar. 11, 2014, https://ieeexplore.ieee.org/document/6763083.

*Primary Examiner* — Alicia M. Choi
(74) *Attorney, Agent, or Firm* — ScienBiziP, P.C.

(57) ABSTRACT

A method for controlling a cutting tool in a CNC machine and a device using the method receives contours of workpieces generated by a first measuring machine, inputs the first contour parameters into a calculation model to output first compensation values of the cutting tool, the calculation model being a time sequences model established according to contour sets of the workpieces, and the contour sets include at least one historical contour of the workpieces. The device further determines whether the first compensation values of the cutting tool are greater than, equal to or smaller than a preset value, and sends the first compensation values of the cutting tool to a machine.

17 Claims, 3 Drawing Sheets

(51) Int. Cl.
  *G05B 19/4062*   (2006.01)
  *G05B 19/408*    (2006.01)
  *G06F 17/10*    (2006.01)
  *G06N 7/00*    (2023.01)
  *G06F 17/13*    (2006.01)
  *G05B 19/404*   (2006.01)

(52) U.S. Cl.
  CPC ..... *G05B 19/4062* (2013.01); *G05B 19/4083* (2013.01); *G06F 17/10* (2013.01); *G06F 17/13* (2013.01); *G06N 7/00* (2013.01)

(56) References Cited

U.S. PATENT DOCUMENTS

| | | | |
|---|---|---|---|
| 2014/0324743 | A1* | 10/2014 | Lakshminarayan ..... G06N 7/00 706/58 |
| 2016/0016363 | A1* | 1/2016 | Smith .................... B33Y 50/00 700/98 |
| 2016/0202691 | A1* | 7/2016 | Pettersson ........ G05B 19/41865 700/98 |
| 2019/0041827 | A1* | 2/2019 | Amaya ................... B22F 10/80 |
| 2021/0078126 | A1* | 3/2021 | Stein ...................... B23Q 17/20 |
| 2021/0397142 | A1* | 12/2021 | Lovell .................... G06F 30/10 |

FOREIGN PATENT DOCUMENTS

| | | | | |
|---|---|---|---|---|
| CN | 111090688 A | * | 5/2020 | ......... G06F 16/2474 |
| DE | 102015006636 | | 11/2016 | |
| JP | 2019067098 | | 4/2019 | |

* cited by examiner

DEVICE, METHOD AND NON-TRANSITORY STORAGE MEDIUM FOR CONTROLLING CUTTING TOOL

CROSS-REFERENCE TO RELATED APPLICATIONS

This application claims priority to Chinese Patent Application No. 202010550682.9 filed on Jun. 16, 2020, the contents of which are incorporated by reference herein.

FIELD

The present disclosure relates a field of automated control, especially relates to a method for controlling cutting tool in CNC cutting machine and a device using the same.

BACKGROUND

In an existing cutting tool compensation scheme, the cutting tool compensation scheme requires more manpower and takes a long time. Moreover, the way in which technicians manually adjust a CNC machine table according to the compensation value of the cutting tool is not consistent, the yield rate of the material processed by the adjusted CNC machine is also inconsistent.

BRIEF DESCRIPTION OF THE DRAWINGS

Implementations of the present disclosure will now be described, by way of embodiments, with reference to the attached figures.

DETAILED DESCRIPTION

Figure 1:
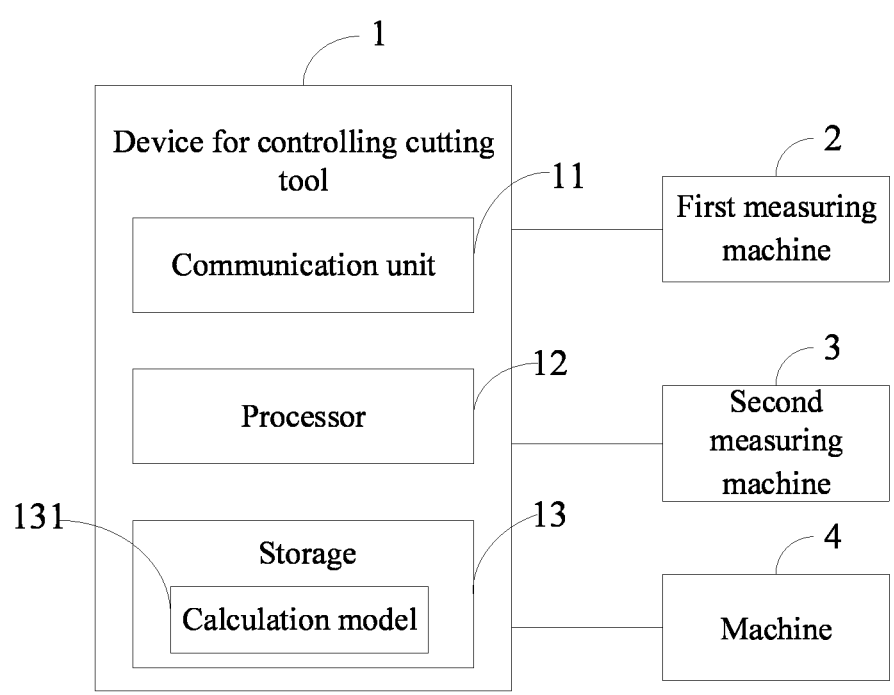
FIG. 1 is a block diagram of one embodiment of an operating environment of a method for controlling cutting tool.

In order to better understand purposes, characteristics, and advantages of the present disclosure, the present disclosure is described in detail below in conjunction with the drawings and specific embodiments. It should be noted that, in the absence of conflict, the embodiments of the present disclosure and the characteristics of the embodiments may be combined with each other.

Many specific details are described in the present disclosure below to facilitate a full understanding of the present disclosure, and the embodiment described is only part of the embodiment of the present disclosure, not the whole embodiment. Based on the embodiments in the present disclosure, all other embodiments obtained by ordinary technical person in this field without creative work fall within the scope of protection of the present disclosure.

Unless otherwise defined, all technical and scientific terms used herein are of the same meaning as those commonly understood by technicians who are in the technical field of the present disclosure. The terminology used in the specification of this application herein is intended only to describe the purpose of the specific embodiment and is not intended to limit the present disclosure.

As used in the disclosure, the term "communicator" may refer to any type of communication circuit or device. A communicator can be implemented as several types of network components or can contain several types of network components, including base stations, router devices, switchgear, server devices, aggregator devices, bus architectures or analogs. One or more bus architectures can contain industrial bus architectures, such as Ethernet-based industrial buses, controller local area network (CAN) buses, Modbus, other types of fieldbus architectures, and so on.

As used in the present disclosure, the term "processor" may refer to any type of processing circuit or device. The processor can be implemented as a combination of processing circuits or computational processing units, such as CPUs, GPUs, or a combination of both. Therefore, for describing the purposes of the present disclosure, a processor can refer to a single-core processor, a single processor with software multithreaded execution, a multicore processor with software multithreaded execution, a multicore processor with hardware multithreaded technology, a parallel processing (or computing) platform, and a parallel computing platform with distributed shared memory. In addition, or for example, a processor may refer to an integrated circuit (IC), a dedicated integrated circuit (ASIC), a digital signal processor (DSP), a field programmable gate array (FPGA), a programmable logic controller (PLC), a complex programmable logic device (CPLD), a discrete door circuit or transistor logic, a discrete hardware component, or any combination of functions designed or configured (for example, manufactured) to perform the functions described here. In some embodiments, the processor may use a nanoscale architecture in order to optimize space use or enhance the performance of system, device, or other electronic devices under the present disclosure. For example, a processor can contain molecular transistors and/or quantum dot-based transistors, switches, and door circuits.

In addition, in these instructions and drawings, terms such as "storage," "memory," "data store," "data storage," "memory," "storage," "storage" and any other basic language regarding information storage components related to the operation and function of the components refer to memory components, entities implemented in one or more memory devices, or to components that form memory devices. It should be noted that the memory components or memory devices described in the present disclosure implement or contain non-transient computer storage media that can be read or accessed by a computing device. Such media can be implemented by any method or technique used to store information, such as machine-accessible instructions (for example, computer readable instructions), information structures, program modules, or other information objects.

The memory components or memory devices disclosed in the present disclosure may be implemented as volatile or non-volatile memory, or may contain both volatile and non-volatile memory. In addition, memory components or memory devices may be removable or non-removable, and/or inside or outside the computing device or component. Instances of various types of non-transient storage media can contain hard drives, zip drives, CD-ROMs, digital multi-use disks (DVDs) or other optical storage, cartridges, tapes, disk storage, or other types of magnetic storage devices, flash cards, or other types of memory cards, cassettes, or any other non-transient media that is suitable for retaining the required information and can be accessed by a computing device. For example, the non-volatile memory can contain read-only memory (ROM), programmable ROM (PROM), electrically programmable ROM (EPROM), electro-erasable programmable ROM (EEPROM), or flash memory. The volatile memory can contain random access memory (RAM) that is used as external buffer memory.

RAM may be in many forms as a description, and is not a limitation, such as synchronous RAM (SRAM), dynamic RAM (DRAM), synchronous DRAM (SDRAM), dual data rate SDRAM (DDR SDRAM), enhanced SDRAM (ESDRAM), synchronous link DRAM (SLDRAM), and direct Rambus RAM (DRRAM). The disclosed memory devices or storage in the operating or computing environment described here are intended to contain one or more of these and/or any other suitable types of memory.

Unless specified or otherwise understood in the context used, conditional languages such as "can," "can," "may," or "can" are usually intended to convey that some implementations may contain certain characteristics, components, and/or actions, while others are not. Therefore, the conditional language is generally not intended to imply that features, components, and/or operations are required in any way for one or more implementations, or that one or more implementations must contain logic to determine whether those features, components, and/or operations are included or will be performed in any particular implementation without user input.

The flowcharts and blocks in the drawings show the possible architecture, functions, and operations of the systems, methods, and examples of computer program products based on the various embodiments of the present disclosure. Each block in a flowchart or block diagram can represent a module, segment, or part of an instruction that contains one or more machine or computer executable instructions that are used to implement the specified operation. Each block in the block diagram and/or flowchart, as well as the combination of the blocks in the block diagram and/or flowchart, can be implemented by a system based on dedicated hardware. The system based on the dedicated hardware can perform specified functions or operations, or can perform a combination of the special hardware and computer instructions.

The computer-readable program instructions of the present disclosure may be downloaded from computer-readable storage media or external computers or external storage devices to the appropriate computing/processing devices over the network (e.g., the Internet, local area network, WAN and/or wireless network). The network can contain copper transmission cables, optical transmission fibers, wireless transmissions, routers, firewalls, switches, gateway computers, and/or edge servers. The network adapter card or network interface in each compute/processing device receives the computer-readable program instructions from the network and forwards the computer-readable program instructions for storage in the computer-readable non-transient storage media within the corresponding compute/processing device.

The contents already described in the disclosure and drawings contain examples of systems, equipment, technologies, and computer program products that allow the tracking of components of products manufactured in industrial equipment, individually and in combination. It is not possible to describe each possible combination of components and/or methods for the purpose of describing the various components in the disclosure, but it is recognized that many other combinations and arrangements of the disclosed components are possible. It is clear that various modifications of the disclosure may be made without departing from the scope or spirit of the disclosure. In addition, or as an alternative, other means of implementation of the disclosure may be obvious by considering the specification and drawings and the practice of the disclosure as presented in the disclosure. The examples presented in the specifications and drawings are considered illustrative and not restrictive, in all respects. Although specific terms are used here, they are used only for general and descriptive purposes, not for restrictive purposes.

FIG. 1 illustrates an operating environment of a method for controlling cutting tool. The method is applied in the device 1 for controlling cutting tool. In one embodiment, the device 1 can be a computing device, such as a desktop computer, a notebook, a server, or a cloud terminal. The device 1 includes a communication unit 11, a processor 12, and a storage 13. The device 1 communicates by the communication unit 11 with a first measuring machine 2, a second measuring machine 3, and a machine 4. In one embodiment, the communication unit 11 can be a wireless communication module. For example, the communication unit 11 can be a WI-FI module or a 4G/5G communication module. The communication unit 11 is used to receive information sent by the first measuring machine 2 and/or the second measuring machine 3. For example, the communication unit 11 receives contours of workpieces generated by the first measuring machine 2 and/or the second measuring machine 3. The first measuring machine 2 and/or the second measuring machine 3 generate the contours of the workpieces by detecting and measuring the workpieces. In one embodiment, the contours of the workpieces include height, width, depth, and apertures and other features of the workpieces.

The processor 12 connects to the communication unit 11. In one embodiment, the processor 12 can be a central processing unit (CPU), or a common processor, a Digital Signal Processor (DSP), an Application Integrated Specific Circuit (ASIC), and a Field-Programmable Gate Array (FPGA) or other programmable logic devices, discrete doors or transistor logic devices, discrete hardware components, etc. In another embodiment, the processor 12 may be a microprocessor or any conventional processor, etc. In one embodiment, the processor 12 may also be a control center of the device 1 for controlling cutting tool, using various interfaces and lines to connect the device 1 for controlling cutting tool.

In one embodiment, the storage 13 connects to the processor 12. The storage 13 is used to store data and/or software code. In one embodiment, the storage 13 can be an internal storage unit in the device 1, such as a hard disk or memory in the device 1. In another embodiment, the storage 13 may also be an external storage device in the device 1, such as a plug-in hard disk of the device 1, a Smart Media Card (SMC), a Secure Digital Card (SDC), a flash card, and so on.

Figure 2:
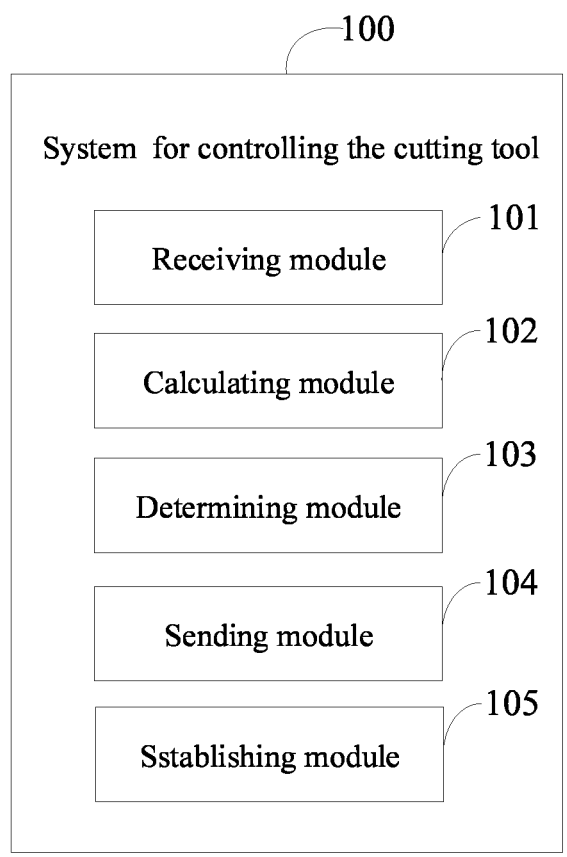
FIG. 2 is a block diagram of an embodiment of a system for controlling cutting tool.

FIG. 2 illustrates the system 100 for controlling the cutting tool. In one embodiment, the system 100 includes one or more modules, which are executed in the device 1. In one embodiment, the system 100 includes a receiving module 101, a calculating module 102, a determining module 103, a sending module 104, an establishing module 105. In one embodiment, the receiving module 101, the calculating module 102, the determining module 103, the sending module 104, and the establishing module 105 are stored in the storage 13 of the device 1 and executed by the processor 12 of the device 1. The modules 101-105 of the present disclosure refer to a series of computer program instruction segments capable of completing specific functions, which describes the execution process of the software in the system 100. In other embodiments, the receiving module 101, the calculating module 102, the determining module 103, the sending module 104, and the establishing module 105 are program segments or codes embedded in or called-up by the processor 12 of the device 1.

The receiving module 101 receives first contour parameters of workpieces detected by the first measuring machine 2 by the communication unit 11. In one embodiment, the first measuring machine 2 is a CNC machine, and the CNC machine includes a probe, and the CNC machine detects the first contour parameters of the workpieces by the probe.

The calculating module 102 inputs the first contour parameters into a calculation model 131 to output first compensation values of the cutting tool. The calculation model 131 is a time sequences model established according to contour parameter set of the workpieces, and the contour parameter set includes at least one historical contour parameter of workpieces. In one embodiment, the calculation model 131 is stored in the storage 13.

The determining module 103 generates control instructions when determining that the first compensation values of the cutting tool are smaller than or equal to a preset value a preset value.

In response to the control instructions, and through the communication unit 11, the sending module 104 sends the first compensation values of the cutting tool to the machine 4 that controls the cutting tool.

In one embodiment, the machine 4 applies compensation to the cutting tool in the machine 4 according to the first compensation values of the cutting tool. For example, the first contour parameters of the workpieces include height of the workpieces, the device 1 sends +1 cm as the first compensation values of the cutting tool to the machine 4, and the machine 4 increases the cutting tool 1 cm according to the first compensation values of the cutting tool, so that the cutting tool can process out workpieces with a height of 1 cm.

The establishing module 105 acquires the contour parameter set and the compensation value set of the cutting tool corresponding to the contour parameter set, combines the contour parameter set with the compensation value set to form time sequences of compensation values of the cutting tool, divides the time sequences of compensation values to form metadata, determines a set of weightings according to the metadata, and adjusts the time sequences of compensation values according to the set of weightings to generate a calculation model 131. In one embodiment, when determining a set of weightings according to the metadata, the establishing module 105 determines a change of magnitude values according to the metadata, and the change in magnitude values is used to smoothly process the time sequences of compensation values of the cutting tool. The establishing module 105 marks the change in magnitude values to form marker values, generates trend indicators of the time sequences of compensation values according to the marker values, acquires a result when the trend indicators are stable, generates a cutting tool compensation initial model according to the trend indicators and the result, and generates the set of weightings according to the cutting tool compensation initial model.

In one embodiment, the calculation model 131 is an Autoregressive Integrated Moving Average (ARIMA (p, d, q)) model. When dividing the time sequences of compensation values to form the metadata, the establishing module 105 determines whether the metadata is stable, performs a differential calculation of the metadata to get the change in magnitude values when the metadata is not stable, generates a differential time sequences of compensation values according to the change in magnitude values to apply stability to the time sequences of compensation values. In one embodiment, the establishing module 105 determines whether change in values of the metadata changes in the adjacent time periods is greater than the preset value, and determines that the metadata is not stable when the change in values of the metadata changes in the adjacent time period is greater than the preset value. For example, two compensation values of the cutting tool of two metadata in two adjacent time periods are 1 and −2, and the preset value id is 2, and the change in value between 1 and −2 is 1−(−2)=3. As 3 is greater than 2, the establishing module 105 therefore determines that the two metadata are not stable.

The establishing module 105 further determines whether the change in magnitude values converges, and further performs differential calculation to the differential time sequences of compensation values until a differential calculation result of the change in magnitude values converges. In one embodiment, the establishing block 105 counts number of times that the metadata is differentially calculated and regards the times as differential order d of the calculation model 131. In one embodiment, when the change in magnitude values of the differential time sequences of compensation values converges, the establishing module 105 marks the change in magnitude values to generate the marker values, calculates the mathematical statistical values of the marker values, and takes the mathematical statistical values of the marker value as the trend indicators of the time sequences of the compensation values, determines whether the mathematical statistical values are smaller than or equal to a preset value a preset critical value, and determines that the differential time sequences of compensation values converges when the mathematical statistical values are smaller than or equal to a preset value the preset critical value, and determines that the differential time sequences of compensation values do not converge when the mathematical statistical values are greater than the preset critical value. Namely, when the mathematical statistical values are smaller than or equal to a preset value the preset critical value, the trend indicators of the time sequences of the compensation values are stable, and when the mathematical statistical values are greater than a preset critical value, the trend indicators are not stable. For example, time sequences of the compensation values are ((10, 20, 30, 40), (1, −2, 3, −4) in one hour, wherein (10, 20, 30, 40) represents the counter parameter set, (1, −2, 3, −4) represents compensation value set of the cutting tool. If divided by one hour, the adjacent two metadata after dividing can be (10, 1) and (20, −2), for the counter parameters of the adjacent two metadata, 10 to 20 is increased, therefore the marker value is +10, for the compensation values of the adjacent two metadata, 1 to −2 is reduced, the marker value is −3. In one embodiment, when calculating the mathematical statistics of the marker values, the mathematical statistical values of the marker values are determined by summing or averaging the marker values. For example, after dividing the time sequences of the compensation values, the marker values of one segment of the metadata are −2, +3, −1, +1, and the mathematical statistical values is calculated as +1 by summing −2, +3, −1, +1. The preset critical value is +2. As the mathematical statistical value +1 is smaller than or equal to the preset critical value +2, the establishing module 105 determines that the differential time sequences of compensation values converge, namely, it determines that the trend indicators are stable.

In one embodiment, when the differential time sequences of compensation values converge, the establishing module 105 establishes the cutting tool compensation initial model according to the converged differential time sequences of compensation values converge, and generates the set of weightings according to the differential order d of the calculation model 131 and the cutting tool compensation initial model. In one embodiment, the establishing module 105 determines a self-correlation graph (ACF) by calculating the differential time sequences of compensation values, and performs a partial correlation calculation on the differential time sequences to obtain a partial ACF (PACF), determines whether the ACF and the PACF are tail-ended or cut-off respectively to obtain results, and sets the cutting tool compensation initial model according to the determination, wherein the ACF is used to represent correlation between the differential time sequences of compensation values, the PACF is used to indicate the correlation between the contour parameters and the compensation values of the cutting tool. In one embodiment, when the ACF of the differential time sequences of compensation values is tail-ended and the PACF is cut-off, the cutting tool compensation initial model is a self-regression model (such as AR model). When the ACF of the differential time sequences of compensation values is tail-ended and the PACF is tail-ended, the cutting tool compensation initial model is a self-regression moving average model (such as ARMA model).

In one embodiment, when generating the set of weightings according to the differential order d of the calculation model 131 and the cutting tool compensation initial model, the establishing module 105 determines the number of self-regression items P and/or the number of moving average items Q of the cutting tool compensation initial model according to an equatorial information quantity standard (AIC standard) and a Bayesian standard (BIC standard), and takes the differential order d of the calculation model 131, the number of self-regression items P and/or the number of moving average items Q of the cutting tool compensation initial model as the set of weightings of the calculation model 131. In one embodiment, the establishing module 105 calculates the values of the AIC and BIC according to AIC standard and a BIC standard, and determines the number of the self-regression items P and/or the number of the moving average items Q corresponding to the minimum AIC value and the minimum BIC value as the number of the self-regression items P and/or the number of the moving average items Q of the cutting tool compensation initial model.

In present disclosure, the device 1 establishes the calculation model 131 according to the contour parameter set of the workpieces and the compensation value set of the cutting tool, and inputs the detected contour parameter set of the workpieces into the calculation model 131 to output the compensation values of the cutting tool corresponding to the contour parameters of the workpieces, and controls the machine 4 to automatically apply compensation to the cutting tool of the machine 4 according to the compensation values of the cutting tool, thereby reducing consumption of manpower, and improving the biotech efficiency and making the workpieces processed by the cutting tool stable.

In one embodiment, when determining that the first compensation values of the cutting tool are greater than the preset value, the determining module 103 receives the second compensation parameters of the cutting tool sent by the second measuring machine 3, and the second compensation parameters of the cutting tool are generated by the second measuring machine 3 detecting the workpieces, wherein the accuracy of the second compensation parameters of the cutting tool is greater than the accuracy of the first compensation parameters. The calculating module 102 inputs the second contour parameters into the calculation model 131 to output the second compensation values of the cutting tool. The sending module 104 sends the second compensation values of the cutting tool by the communication unit 11 to the machine 4 to make the machine 4 apply compensation to the cutting tool of the machine 4 according to the second compensation values of the cutting tool. In one embodiment, the second measuring machine 3 is a three dimensional device, and the three dimensional device detects metadata of the three dimensions of the workpieces' second compensation values of the cutting tool and sends metadata as to the three dimensions of the workpieces' second compensation values of the cutting tool to the device 1.

In one embodiment, when determining that the first compensation values of the cutting tool are greater than the preset value, the determining module 103 calculates the difference between the compensation values of the cutting tool and the preset value, and determines whether the difference is greater than a preset difference. When the difference is greater than the preset difference, the determining module 103 generates a first abnormal level and generates a stop instruction according to the first abnormal level. The sending module 104 sends the stop instruction to the machine 4, so that the machine 4 shuts down in accordance with the stop instruction and issues an alarm by a means of a preset alarm. In present disclosure, when the first compensation values of the cutting tool are greater than the preset value, the machine 4 sounds alarm, therefore, the serious abnormality of the cutting tool in the machine 4 can be found in time. For example, when the difference between the compensation values of the cutting tool and the preset value is 2 cm, and the preset difference is 1 cm, as the difference (2 cm) is greater than the preset difference (1 cm), the determining module 103 generates the first abnormal level and generates the stop instruction according to the first abnormal level, and the sending module 104 sends the stop instruction to the machine 4, and the machine 4 shuts down in accordance with the stop instruction and issues alarm by flashing lights, sending voice messages, or displaying dialog boxes, therefore, the serious abnormality of the cutting tool in the machine 4 can be found in time.

The determining module 103 generates a second abnormal level and generates a prompting instruction according to the second abnormal level when the difference is greater than the preset difference, and the sending module 104 sends the prompting instruction to the machine 4 to inform a user to adjust the cutting tool manually. Therefore, the accuracy of controlling cutting tool is ensured by manual adjustment when the difference between the first compensation values of the cutting tool and the preset value is greater than the preset difference. For example, when the difference between the first compensation value of the cutting tool and the preset value is 1 cm, and the preset difference is 0.5 cm. As the difference (1 cm) is greater than the preset difference (0.5 cm), the determining module 103 generates the second abnormal level and generates the prompting instruction according to the second abnormal level, and the sending module 104 sends the prompting instruction to the machine 4, and the machine 4 informs the user to adjust the cutting tool manually. Therefore, the accuracy of control of the cutting tool is ensured.

Figure 3:
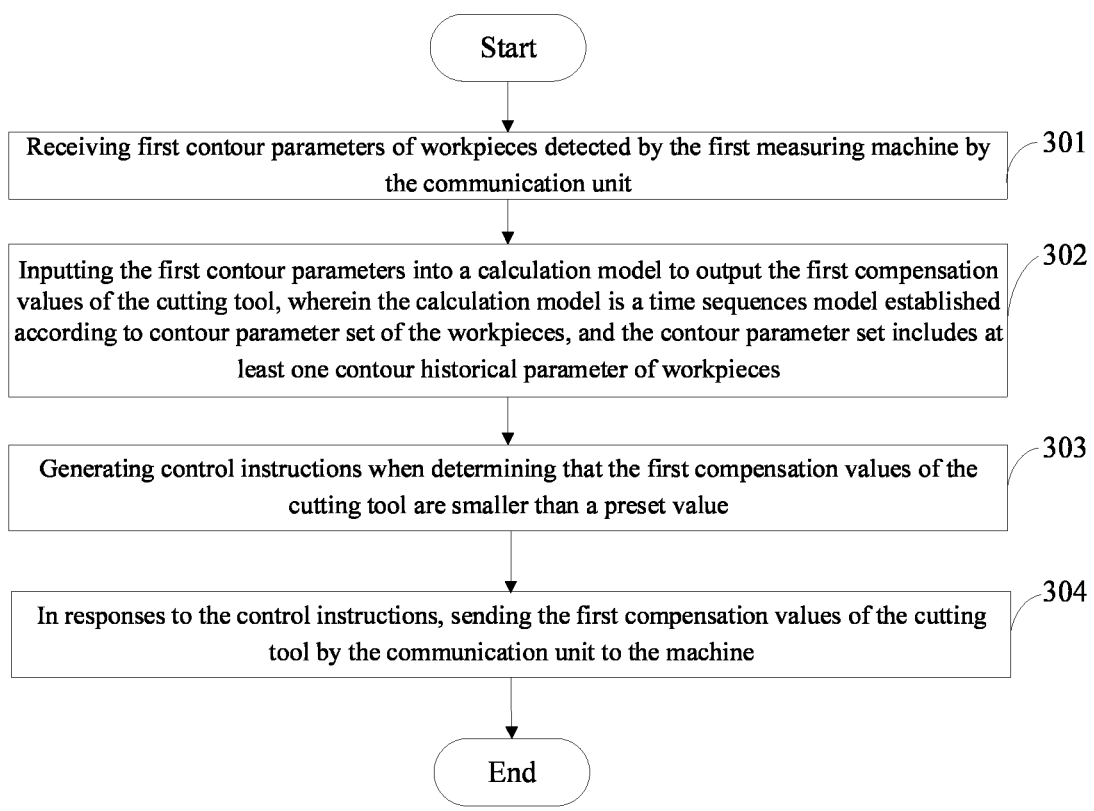
FIG. 3 is a flowchart of one embodiment of a method for controlling cutting tool.

FIG. 3 illustrates a flowchart of one embodiment of a method for controlling cutting tool. The method is applied in the device for controlling cutting tool. Depending on different needs, the order of the steps in the flowchart can change, and some steps can be omitted or merged. The method includes the following steps.

At block 301, receiving first contour parameters of workpieces detected by the first measuring machine 2 by the communication unit 11.

In one embodiment, the first measuring machine 2 is a CNC machine, and the CNC machine includes a probe, and the CNC machine detects the first contour parameters of the workpieces by the probe.

At block 302, inputting the first contour parameters into a calculation model 131 to output the first compensation values of the cutting tool, wherein the calculation model 131 is a time sequences model established according to contour parameter set of the workpieces, and the contour parameter set includes at least one contour historical parameter of workpieces.

At block 303, generating control instructions when determining that the first compensation values of the cutting tool are smaller than or equal to a preset value a preset value.

At block 304, in responses to the control instructions, sending the first compensation values of the cutting tool by the communication unit 11 to the machine 4 that controls the cutting tool.

In one embodiment, the machine 4 compensates cutting tool in the machine 4 according to the first compensation values of the cutting tool. For example, the first contour parameters of the workpieces include height of the workpieces, the device 1 sends +1 cm as the first compensation values of the cutting tool to the machine 4, and the machine 4 increases the cutting tool 1 cm according to the first compensation values of the cutting tool, so that the cutting tool can process out workpieces with a height of 10 cm.

In one embodiment, the method further includes: acquiring the contour parameter set and the compensation value set of the cutting tool corresponding to the contour parameter set, combining the contour parameter set with the compensation value set to form time sequences of compensation values of the cutting tool, dividing the time sequences of compensation values to form metadata, determining a set of weights according to the metadata, and adjusting the time sequences of compensation values according to the set of weights to form a calculation model 131.

In one embodiment, when determining a set of weights according to the metadata, the device 1 determines change magnitude values according to the metadata, and the change magnitude values are used to smoothly process the time sequences of compensation values of the cutting tool. The device 1 marks the change magnitude values to form marker values, generates trend indicators of the time sequences of compensation values according to the marker values, acquires a result when the trend indicators are stability, generates a cutting tool compensation initial model according to the trend indicators and the result, and generates the set of weights according to the cutting tool compensation initial model.

In one embodiment, the calculation model 131 is the Autoregressive Integrated Moving Average model ARIMA (p, d, q). When dividing the time sequences of compensation values to form the metadata, the device 1 determines whether the metadata is stable, performs a differential calculation of the metadata to get the change magnitude values when the metadata is not stable, generates a differential time sequences of compensation values according to the change magnitude values to stable the time sequences of compensation values. In one embodiment, the device 1 determines whether change values of the metadata changes in the adjacent time periods is greater than the preset value, and determines that the metadata is not stable when the change values of the metadata changes in the adjacent time period is greater than the preset value. For example, two compensation values of the cutting tool of two metadata in two adjacent time periods are 1 and −2, and the preset value id 2, and the change value between 1 and −2 is 1−(−2)=3. As 3 is greater than 2, therefor, the device 1 determines the two metadata are not stable.

The device 1 further determines whether the change magnitude values converges, and further performs differential calculation to the differential time sequences of compensation values until a differential calculation result of the change magnitude values converges. In one embodiment, the device 1 counts times that the metadata is differentially calculated and regards the times as differential order d of the calculation model 131. In one embodiment, when determining whether the change magnitude values of the differential time sequences of compensation values converges, the device 1 marks the change magnitude values to generates the marker values, calculates the mathematical statistical values of the marker values, and takes the mathematical statistical values of the marker value as the trend indicators of the time sequences of the compensation values, determines whether the mathematical statistical values are smaller than or equal to a preset value a preset critical value, and determines that the differential time sequences of compensation values converges when the mathematical statistical values are smaller than or equal to a preset value the preset critical value, and determines that the differential time sequences of compensation values don't converge when the mathematical statistical values are not smaller than the preset critical value. Namely, when the mathematical statistical values are smaller than or equal to a preset value the preset critical value, the trend indicators of the time sequences of the compensation values are stable, and when the mathematical statistical values are not smaller than a preset critical value, the trend indicators are not stable. For example, time sequences of the compensation values are ((10, 20, 30, 40), (1, −2, 3, −4) in one hour, wherein (10, 20, 30, 40) represents the counter parameter set, (1, −2, 3, −4) represents compensation value set of the cutting tool. If divided by one hour, the adjacent two metadata after dividing can be (10, 1) and (20, −2), for the counter parameters of the adjacent two metadata, 10 to 20 is increased, therefore the marker value is +10, for the compensation values of the adjacent two metadata, 1 to −2 is reduced, the marker value is −3. In one embodiment, when calculates the mathematical statistics of the marker values, the mathematical statistical values of the marker values are determined by summing or averaging the marker values. For example, after diving the time sequences of the compensation values, the marker values of one segment of the metadata are −2, +3, −1, +1, and the mathematical statistical values is calculated as +1 by summing −2, +3, −1, +1. The preset critical value is +2. As the mathematical statistical value +1 is smaller than or equal to the preset critical value +2, the device 1 determines that the differential time sequences of compensation values converge, namely, determines that the trend indicators are stable.

In one embodiment, when the differential time sequences of compensation values converge, the device 1 establishes the cutting tool compensation initial model according to the converged differential time sequences of compensation values converge, and generates the set of weights according to the differential order d of the calculation model 131 and the cutting tool compensation initial model. In one embodiment, the device 1 determines a self-correlation graph (ACF) by calculating the differential time sequences of compensation values, and performs a partial correlation calculation on the differential time sequences to obtain a partial correlation graph (PACF), determines whether the ACF and the PACF are tail-ended or cut-off respectively to obtain a result, and determines the cutting tool compensation initial model according to the result, wherein the ACF is used to represent correlation relationship between the differential time sequences of compensation values, the PACF is used to indicate the correlation relationship between the contour parameters and the knife compensation values of the cutting tool. In one embodiment, when the ACF of the differential time sequences of compensation values are tail-ended and the PACF is cut-off, the cutting tool compensation initial model is a self-regression model (such as AR model). When the ACF of the differential time sequences of compensation values are tail-ended and the PACF is tail-ended, the cutting tool compensation initial model is a self-regression moving average model (such as ARMA model).

In one embodiment, when generating the set of weights according to the differential order d of the calculation model 131 and the cutting tool compensation initial model, the device 1 determines the number of self-regression items P and/or the number of moving average items Q of the cutting tool compensation initial model according to an equatorial information quantity standard (AIC standard) and a Bayesian standard (BIC standard), and takes the differential order d of the calculation model 131, the number of self-regression items P and/or the number of moving average items Q of the cutting tool compensation initial model as the set of weights of the calculation model 131. In one embodiment, the device 1 calculates AIC s and BIC values according to a equatorial information quantity standard and a Bayesian standard, and determines the number of the self-regression items P and/or the number of the moving average items Q corresponding to the minimum AIC value and the minimum BIC value as the number of the self-regression items P and/or the number of the moving average items Q of the cutting tool compensation initial model.

In present disclosure, the device 1 establishes the calculation model 131 according to the contour parameter set of the workpieces and the compensation value set of the cutting tool, and input the detected contour parameter set of the workpieces into the calculation model 131 to output the compensation values of the cutting tool corresponding to the contour parameters of the workpieces, and control the machine 4 automatically compensate the cutting tool of the machine 4 according to the compensation values of the cutting tool, thereby reducing consumption of manpower, and improving the biotech person's efficiency and making the workpieces processed by the cutting tool stable.

In one embodiment, the method further includes: when determining that the first compensation values of the cutting tool are greater than the preset value, the device 1 receives the second compensation parameters of the cutting tool send by the second measuring machine 3, and the second compensation parameters of the cutting tool is generated by the second measuring machine 3 detecting the workpieces, wherein the accuracy of the second compensation parameters of the cutting tool is greater than the accuracy of the first compensation parameters. The device 1 inputs the second contour parameters into the calculation model 131 to output the second compensation values of the cutting tool. The device 1 sends the second compensation values of the cutting tool by the communication unit 11 to the machine 4 to make the machine 4 compensate the cutting tool of the machine 4 according to the second compensation values of the cutting tool. In one embodiment, the second measuring machine 3 is a three dimensions device, and the three dimensions device detects three dimensions metadata of the workpieces' second compensation values of the cutting tool and sends three dimensions metadata of the s workpieces' second compensation values of the cutting tool to the device 1.

In one embodiment, when determining that the first compensation values of the cutting tool are greater than the preset value, the device 1 calculates the difference between the compensation values of the cutting tool and the preset value, and determine whether the difference is greater than a preset difference. When the difference is greater than the preset difference, the device 1 generates a first abnormal level and generates a stopping instruction according to the first abnormal level. The device 1 sends the stopping instruction to the machine 4, so that the machine 4 shuts down in accordance with the stopping instruction and alarms by a means of a preset alarm. In present disclosure, when the first compensation values of the cutting tool are greater than the preset value, the machine 4 alarms, therefore, the serious abnormality of the cutting tool in the machine 4 can be found in time. For example, when the difference between the compensation values of the cutting tool and the preset value is 2 cm, and the preset difference is 1 cm, as the difference (2 cm) is greater than the preset difference (1 cm), the device 1 generates the first abnormal level and generates the stopping instruction according to the first abnormal level, and the device 1 sends the stopping instruction to the machine 4, and the machine 4 shuts down in accordance with the stopping instruction and alarms by flashing lights, sending voice messages, or displaying dialog boxes, therefore, the serious abnormality of the cutting tool in the machine 4 can be found in time.

The device 1 generates a second abnormal level and generates a prompting instruction according to the second abnormal level when the difference is greater than the preset difference, and the device 1 sends the prompting instruction to the machine 4 to inform the biotech person to adjust the cutting tool manually. Therefore, the accuracy of controlling cutting tool is ensured by manual adjustment when the difference between the first compensation values of the cutting tool and the preset value is greater than the preset difference. For example, when the difference between the first compensation values of the cutting tool and the preset value is 1 cm, and the preset difference is 0.5 cm. As the difference (1 cm) is greater than the preset difference (0.5 cm), the device 1 generates the second abnormal level and generates the prompting instruction according to the second abnormal level, and the device 1 sends the prompting instruction to the machine 4, and the machine 4 informs a person or people to adjust the cutting tool manually. Therefore, ensures the accuracy of controlling cutting tool.

For technical personnel in this field, it is clear that the present disclosure is not limited to the details of the above-mentioned exemplary embodiments and can be implemented in other specific forms without departing from the spirit or basic characteristics of the disclosure. Accordingly, the embodiments should be considered exemplary and non-restrictive from any point of view, and the scope of the disclosure is limited by the attached claims rather than by the above description and it is that all changes falling within the meaning and scope of the equivalent elements of the claim are intended to be included in the disclosure. Any drawing marks in the claims should not be considered as limitations. In addition, it is clear that the term "containment" does not exclude other modules or steps, and singulars do not exclude plurals. Multiple modules or electronic devices stated in the claims of the electronic device may also be implemented by the same module or electronic device through software or hardware. First, and second words are used to represent a name, not in any particular order.

Finally, it should be noted that the above embodiments are intended only to illustrate the technical scheme of the disclosure and not to limit it, although the application is detailed in the light of better embodiments, the ordinary technical personnel in this field should understand that the technical scheme of this application may be modified or replaced equally, without departing from the spirit and scope of the technical scheme of the disclosure.

What is claimed is:

1. A device for controlling cutting tool in a machine, comprising:
   a processor; and
   a non-transitory storage medium coupled to the processor and configured to store a plurality of instructions, the instructions causing the processor to:
   establish a calculation model, wherein the calculation model is a time sequences model established according to a contour parameter set of the workpieces, and the contour parameter set comprises at least one historical contour parameter of the workpieces, and the calculation model is stored in the non-transitory storage medium, wherein establishing the calculation model comprises:
   acquire the contour parameter set and a compensation value set of a cutting tool corresponding to the contour parameter set;
   combine the contour parameter set with the compensation value set to form time sequences of compensation values of the cutting tool;
   divide the time sequences of compensation values to form metadata;
   determine a change of magnitude values according to the metadata, the change of the magnitude values being used to smoothly process the time sequences of compensation values of the cutting tool;
   mark the change of the magnitude values to form marker values;
   generate trend indicators of the time sequences of compensation values according to the marker values;
   acquire a result when the trend indicators are stable;
   generate a cutting tool compensation initial model according to the trend indicators and the result; and
   generate a set of weights according to the cutting tool compensation initial model;
   adjust the time sequences of compensation values according to the set of weights to form the calculation model;
   receive first contour parameters of workpieces from a first measuring machine, input the first contour parameters into the calculation model that is configured to output first compensation values of the cutting tool;
   determine that the first compensation values of the cutting tool are smaller than or equal to a preset value a preset value; and
   send the first compensation values of the cutting tool to the machine to control the cutting tool.

2. The device for controlling cutting tool according to claim 1, wherein the plurality of instructions further cause the processor to:
   in response that the first compensation values of the cutting tool are greater than the preset value, receive second contour parameters of the cutting tool sent by a second measuring machine, an accuracy of the second contour parameters of the cutting tool being greater than an accuracy of the first contour parameters;
   input the second contour parameters into the calculation model that is configured to output second compensation values of the cutting tool; and
   send the second compensation values of the cutting tool to the machine to make the machine compensate the cutting tool of the machine according to the second compensation values of the cutting tool.

3. The device for controlling cutting tool according to claim 1, wherein the plurality of instructions further cause the processor to:
   in response that the first compensation values of the cutting tool are greater than the preset value, calculate a difference between the first compensation values of the cutting tool and the preset value; and
   in response that the difference is greater than a preset difference, generate a first abnormal level and generate a stopping instruction according to the first abnormal level.

4. The device for controlling cutting tool according to claim 3, wherein the plurality of instructions further cause the processor to:
   in response that the difference is smaller than or equal to the preset difference, generate a second abnormal level and generate a prompting instruction according to the second abnormal level.

5. The device for controlling cutting tool according to claim 1, wherein the calculation model comprises an Autoregressive Integrated Moving Average model.

6. The device for controlling cutting tool according to claim 1, wherein the plurality of instructions further cause the processor to:
   count times that the metadata is differentially calculated and regard the times as differential order d of the calculation model;
   determine self-regression items P or moving average items Q of the cutting tool compensation initial model according to an equatorial information quantity standard and a Bayesian standard, wherein the cutting tool compensation initial model comprises a self-regression moving average model or a self-regression model; and
   take the differential order d, the self-regression items P or the moving average items Q of the cutting tool compensation initial model as the set of weights of the calculation model.

7. A method for controlling cutting tool, comprising:
   receiving first contour parameters of workpieces generated by a first measuring machine;
   establishing a calculation model, wherein the calculation model is a time sequences model established according to a contour parameter set of the workpieces, and the contour parameter set comprises at least one historical contour parameter of the workpieces, wherein establishing the calculation model comprises:
   acquire the contour parameter set and a compensation value set of a cutting tool corresponding to the contour parameter set;
   combine the contour parameter set with the compensation value set to form time sequences of compensation values of the cutting tool;
   divide the time sequences of compensation values to form metadata;

determine a change of magnitude values according to the metadata, the change of the magnitude values being used to smoothly process the time sequences of compensation values of the cutting tool;

mark the change of the magnitude values to form marker values;

generate trend indicators of the time sequences of compensation values according to the marker values;

acquire a result when the trend indicators are stable;

generate a cutting tool compensation initial model according to the trend indicators and the result;

generate a set of weights according to the cutting tool compensation initial model; and adjust the time sequences of compensation values according to the set of weights to form the calculation model;

inputting the first contour parameters into a calculation model that is configured to output first compensation values of the cutting tool;

determining that the first compensation values of the cutting tool are smaller than or equal to a preset value a preset value; and sending the first compensation values of the cutting tool to a machine to control the cutting tool.

8. The method for controlling cutting tool according to claim 7, further comprising:

in response that the first compensation values of the cutting tool are greater than the preset value, receiving second compensation parameters of the cutting tool sent by a second measuring machine, an accuracy of the second contour parameters of the cutting tool being greater than an accuracy of the first contour parameters;

inputting the second contour parameters into the calculation model that is configured to output second compensation values of the cutting tool; and sending the second compensation values of the cutting tool to the machine to make the machine compensate the cutting tool of the machine according to the second compensation values of the cutting tool.

9. The method for controlling cutting tool according to claim 7, further comprising:

when the first compensation values of the cutting tool are greater than the preset value, calculating a difference between the first compensation values of the cutting tool and the preset value; and when the difference is greater than a preset difference, generating a first abnormal level and generating a stopping instruction according to the first abnormal level.

10. The method for controlling cutting tool according to claim 9, further comprising:

when the difference is smaller than or equal to the preset difference, generating a second abnormal level and generate a prompting instruction according to the second abnormal level.

11. The method for controlling cutting tool according to claim 7, wherein the calculation model comprises an Autoregressive Integrated Moving Average model.

12. The method for controlling cutting tool according to claim 7, further comprising:

counting times that the metadata is differentially calculated and regard the times as differential order d of the calculation model;

determining self-regression items P or moving average items Q of the cutting tool compensation initial model according to an equatorial information quantity standard and a Bayesian standard, wherein the cutting tool compensation initial model comprises a self-regression moving average model or a self-regression model; and taking the differential order d, the self-regression items P or the moving average items Q of the cutting tool compensation initial model as the set of weights of the calculation model.

13. A non-transitory storage medium having stored thereon instructions that, when executed by at least one processor of a device for controlling cutting tool, cause the least one processor to execute instructions of a method for controlling cutting tool, the method comprising:

receiving first contour parameters of workpieces generated by a first measuring machine;

establishing a calculation model, wherein the calculation model is a time sequences model established according to a contour parameter set of the workpieces, and the contour parameter set comprises at least one historical contour parameter of the workpieces, wherein establishing the calculation model comprises:

acquire the contour parameter set and a compensation value set of a cutting tool corresponding to the contour parameter set;

combine the contour parameter set with the compensation value set to form time sequences of compensation values of the cutting tool;

divide the time sequences of compensation values to form metadata;

determine a change of magnitude values according to the metadata, the change of the magnitude values being used to smoothly process the time sequences of compensation values of the cutting tool;

mark the change of the magnitude values to form marker values;

generate trend indicators of the time sequences of compensation values according to the marker values;

acquire a result when the trend indicators are stable;

generate a cutting tool compensation initial model according to the trend indicators and the result; and generate a set of weights according to the cutting tool compensation initial model; and adjust the time sequences of compensation values according to the set of weights to form the calculation model;

inputting the first contour parameters into a calculation model that is configured to output first compensation values of the cutting tool;

determining that the first compensation values of the cutting tool are smaller than or equal to a preset value or equal to a preset value; and sending the first compensation values of the cutting tool to a machine to control the cutting tool.

14. The non-transitory storage medium according to claim 13, wherein the method further comprises:

when determining that the first compensation values of the cutting tool are greater than the preset value, receiving second compensation parameters of the cutting tool send by a second measuring machine, and an accuracy of the second contour parameters of the cutting tool being greater than an accuracy of the first contour parameters;

inputting the second contour parameters into the calculation model that is configured to output second compensation values of the cutting tool; and sending the second compensation values of the cutting tool to the machine to make the machine compensate the cutting tool of the machine according to the second compensation values of the cutting tool.

15. The non-transitory storage medium according to claim 13, wherein the method further comprises:
- when the first compensation values of the cutting tool are greater than the preset value, calculating the difference between the compensation values of the cutting tool and the preset value; and
- when the difference is greater than a preset difference, generating a first abnormal level and generating a stopping instruction according to the first abnormal level.

16. The non-transitory storage medium according to claim 15, wherein the method further comprises:
- when the difference is smaller than or equal to the preset difference, generating a second abnormal level and generate a prompting instruction according to the second abnormal level.

17. The non-transitory storage medium according to claim 13, wherein the method further comprises:
- counting times that the metadata is differentially calculated and regard the times as differential order d of the calculation model;
- determining self-regression items P or moving average items Q of the cutting tool compensation initial model according to an equatorial information quantity standard and a Bayesian standard, wherein the cutting tool compensation initial model comprises a self-regression moving average model or a self-regression model; and
- taking the differential order d, the self-regression items P or the moving average items Q of the cutting tool compensation initial model as the set of weights of the calculation model.

\* \* \* \* \*